Sept. 12, 1950 F. J. KOLAR, JR 2,521,921
HUMIDITY TEST CABINET
Filed Oct. 7, 1948

INVENTOR
F. J. KOLAR, JR.
BY E. H. Kane
ATTORNEY

Patented Sept. 12, 1950

2,521,921

UNITED STATES PATENT OFFICE 2,521,921

HUMIDITY TEST CABINET

Frank J. Kolar, Jr., Chicago, Ill., assignor to Western Electric Company, Incorporated, New York, N. Y., a corporation of New York Application October 7, 1948, Serial No. 53,214

6 Claims. (Cl. 73—86)

This invention relates to humidity producing apparatus and more particularly to a cycling humidity test cabinet for determining the resistance of specimens entered therein to accelerated corrosion while subjected to fluctuating conditions of humidity and temperature.

An object of the invention is the provision of a simple and practicable humidity test cabinet in which specimens may be efficiently tested for their resistance to corrosion.

In one embodiment of the invention there is provided a sealed cabinet having a supply of water of a suitable depth in the lower portion of a testing chamber in which an electric heater is immersed, whereby vapor will be generated. Also immersed in the water is a thermocouple which may be connected by means of controls to the heater to maintain the water supply at a predetermined constant temperature. Intermediate the water supply and the upper wall of the cabinet is a horizontal shelf of coiled pipe, through which a coolant may be periodically circulated. The specimens to be tested are placed on a perforated tray, which rests on the shelf of coiled pipe. When coolant is circulated through the coils, the parts are chilled, causing vapor to be condensed thereon. Circulating fans within the cabinet above the tray of specimens serve to cause uniformity of relative humidity and temperature within the testing chamber. The upper wall of the cabinet has a hinged double glass and sealed door whereby inspection of the interior of the cabinet and the specimens may be had without disturbing the humidity or temperature in the testing chamber.

Figure 1:
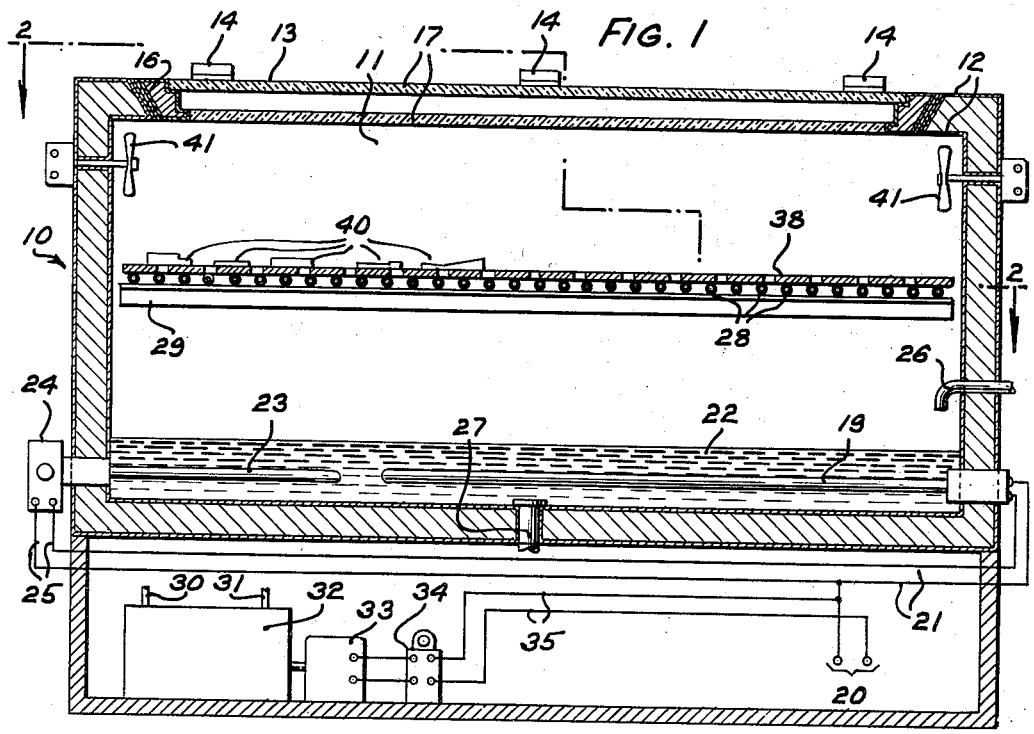
Figure 2:
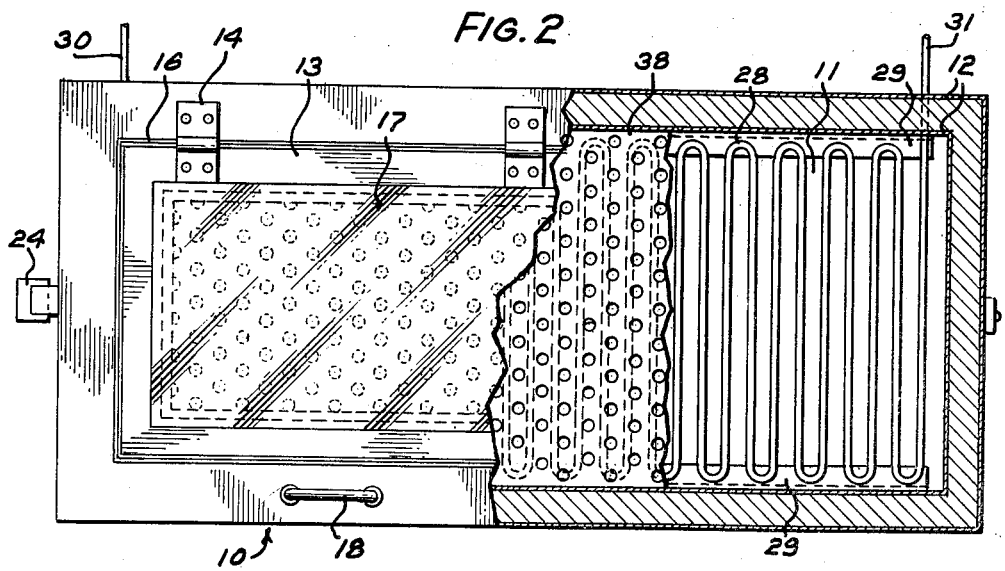

Other objects and advantages of the invention will be understood by referring to the following detailed description when considered in conjunction with the accompanying drawing, in which:

Fig. 1 is a vertical central longitudinal section of a humidity testing cabinet embodying the features of the invention, shown partly in diagrammatic form, and Fig. 2 is a plan view, partly in section, taken on the line 2—2 of Fig. 1.

The humidity test cabinet of this invention, referring particularly to Fig. 1, comprises a rectangular shaped casing, indicated in general at 10, providing a testing chamber 11, the walls of which are constructed of any suitable material, such as wood, sheathed inside and outside with stainless steel or other non-corrosive material, indicated at 12. In its upper wall, the cabinet is fitted with a door 13 hinged at 14 and a suitable seal 16 surrounds the frame of the door at its juncture with the opening in the upper wall to provide a vapor-tight seal therebetween. The door 13 includes a transparent panel comprising two spaced pairs of plate glass 17—17, sealed into position in the door, by means of which the interior of the cabinet and the contents thereof may be readily viewed. Attached to the door 13 are handles 18 for lifting and lowering the door, one of which is shown in Fig. 2.

In the lower portion of the chamber 11 is a waterproof electric heater 19, which extends through and is sealed in an aperture in the right-hand vertical wall of the cabinet (Fig. 1), the heater being connected to a suitable source of electrical energy, indicated at 20, by conductor leads 21—21. A supply of water is carried in the lower portion of the chamber 11 with the electric heater 19 immersed therein, the level of the water supply being indicated at 22. Also immersed in the water supply is a thermocouple 23, which extends through and is sealed in an aperture in the left-hand wall of the cabinet. The thermocouple 23 is operatively connected with a thermostat 24, which is connected into the circuit from the energy source 20 to the heater 19, by conductor leads 25—25, whereby the heater will be controlled to maintain the water supply at a predetermined constant temperature. Water inlet and outlet connections to and from the chamber 11 are provided at 26 and 27, respectively.

Above the water supply level 22 within the chamber 11 and suitably spaced from the door 13 is a shelf of coiled pipe 28, which is supported from opposed walls of the cabinet by angle brackets 29—29 fixed to such walls. Opposite ends of the coiled pipe 28, indicated at 30 and 31, extend through and are sealed in an aperture in a wall of the cabinet, the end 30 may be connected to a suitable motor driven coolant supply source 32 which serves to circulate the coolant through the coiled pipe and the opposite end 31 of the coiled pipe is connected to the coolant supply source for recirculation upon being cooled again. In order to periodically circulate the coolant through the shelf of coiled pipe 28, as desired for the particular test being made, an electric motor 33, which operates the coolant supply source 32, is connected to and controlled by the setting of a suitable electric clock timer 34, conductor leads 35—35 from the timer being connected to the source of electrical energy 20. Freely resting upon the coiled pipe shelf is a readily removable perforated tray 38, preferably of aluminum for supporting parts or specimens, indicated at 40, to be tested for resistance to corrosion. Air circulating means is provided for the chamber 11 in the form of electric fans 41—41 mounted upon opposite end walls of the cabinet, the rotor shafts for the fans extending through bearings sealed in apertures in such walls. The fans are effective to maintain uniformity of relative humidity and temperature within the chamber 11.

The above-described accelerated cycling humidity test cabinet is used to determine the resistance of parts, such as, for instance, metal piece parts or specimen metal plates, which may have been treated with a coating or finish, to predetermined climatic conditions. In use, and assuming that the water supply in the chamber 11 has first been heated sufficiently by the heater 19 to produce vapor with the thermostat 24 set to maintain the water supply at a predetermined constant temperature and the coolant is being circulated periodically through the shelf of coiled pipe 28 from the source 32 by setting the timer 34, all in accordance with the particular conditions desired for the test, the door 13 is opened and a tray 38, with the parts or specimens 40 to be tested, is placed upon the shelf of coiled pipe and the door is closed. During the testing period, which will vary in accordance with the type of tests being made and the particular specimens under test, the specimens may be viewed through the glass panels 17—17 of the door 13.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A humidity test cabinet comprising a sealed chamber having a water-receiving area in the bottom thereof, a heater immersed in the water, a tray supported within the chamber in position above the level of the water, and means for cooling said tray to cause the precipitation of moisture on parts in the tray.

2. A humidity test cabinet for parts comprising a sealed chamber having a water supply area at its bottom portion, a heater immersed in the water supply for generating vapor to produce high conditions of humidity in the chamber, a tray for carrying parts to be tested supported in the chamber above the level of the water supply, and means in the chamber above the level of the water supply and adjacent the tray for cooling said tray to cause condensate of the vapor to form on the parts to be tested.

3. A humidity test cabinet for parts comprising a sealed chamber having a water supply area at its bottom portion, a heater immersed in the water supply for generating vapor to produce high conditions of humidity in the chamber, a tray for carrying parts to be tested supported in the chamber above the level of the water supply, means in the chamber above the level of the water supply and adjacent the tray for cooling said tray to cause condensate of the vapor to form on the parts to be tested, and air circulating means in the chamber above the tray for causing uniformity of relative humidity and temperature in the chamber.

4. A humidity test cabinet for parts comprising a sealed chamber having a water supply area at its bottom portion, a heater immersed in the water supply for generating vapor to produce high conditions of humidity in the chamber, a tray for carrying parts to be tested in the chamber, a shelf of coiled pipe in the chamber above the level of the water supply upon which the tray is supported through which a coolant is circulated periodically for causing condensate of the vapor to form on the parts to be tested periodically, and means for circulating a coolant through the coiled pipe.

5. A humidity test cabinet for parts comprising a sealed chamber having a water supply area at its bottom portion, an electric heater immersed in the water supply for generating vapor to produce high conditions of humidity in the chamber, a perforated tray for carrying parts to be tested supported in the chamber above the level of the water supply, means in the chamber above the level of the water supply and adjacent the tray for cooling said tray to cause condensate of the vapor to form on the parts to be tested, and circulating means in the chamber above the tray for causing uniformity of relative humidity and temperature in the chamber.

6. A humidity test cabinet for parts comprising a sealed chamber having a water supply area at its bottom portion, a heater immersed in the water supply for generating vapor to produce high conditions of humidity in the chamber, a perforated tray for carrying parts to be tested in the chamber, a shelf of coiled pipe in the chamber above the level of the water supply upon which the tray is supported through which a coolant is circulated for causing condensate of the vapor to form on the parts to be tested, means for periodically circulating a coolant through the coiled pipe, and air circulating fans in the chamber above the tray for causing uniformity of relative humidity and temperature in the chamber.

FRANK J. KOLAR, Jr.

REFERENCES CITED

The following references are of record in the file of this patent:

UNITED STATES PATENTS

| Number | Name | Date |
|---|---|---|
| 1,870,512 | Jameson | Aug. 9, 1932 |
| 1,969,606 | Hall | Aug. 7, 1934 |
| 2,302,224 | Jones | Nov. 17, 1942 |
| 2,405,532 | Todd | Aug. 6, 1946 |